United States Patent
Kersting

(10) Patent No.: US 8,757,576 B2
(45) Date of Patent: Jun. 24, 2014

(54) FLORAL ARRANGEMENT DEVICE WITH PIVOTABLE LEAVES

(75) Inventor: Björn Kersting, Braunfels (DE)

(73) Assignee: Stilvoll Design und Manufaktur U.G., Lahnau (DE)

( * ) Notice: Subject to any disclaimer, the term of this patent is extended or adjusted under 35 U.S.C. 154(b) by 543 days.

(21) Appl. No.: 12/936,321

(22) PCT Filed: Mar. 27, 2009

(86) PCT No.: PCT/DE2009/000397
§ 371 (c)(1),
(2), (4) Date: Nov. 18, 2010

(87) PCT Pub. No.: WO2009/121328
PCT Pub. Date: Oct. 8, 2009

(65) Prior Publication Data
US 2011/0049309 A1 Mar. 3, 2011

(30) Foreign Application Priority Data
Apr. 4, 2008 (DE) .......................... 10 2008 017 648

(51) Int. Cl.
*A47F 5/00* (2006.01)
*A01G 5/00* (2006.01)

(52) U.S. Cl.
USPC ...................... 248/354.3; 248/354.4; 47/41.01

(58) Field of Classification Search
USPC .......... 47/41.01; 248/27.8, 354.3, 354.4, 345, 248/155.2; 297/184.14, 184.11; 135/100, 135/90, 99, 135, 147, 28; 403/64, 169–174, 403/217–219; 52/81.1, 81.2
See application file for complete search history.

(56) References Cited

U.S. PATENT DOCUMENTS

| | | | |
|---|---|---|---|
| 549,039 A | 10/1895 | Wenger | |
| 3,115,435 A * | 12/1963 | Abramson | 428/8 |
| 4,074,682 A * | 2/1978 | Yoon | 135/135 |
| 4,280,521 A * | 7/1981 | Zeigler | 135/120.3 |
| 5,444,946 A * | 8/1995 | Zeigler | 52/86 |
| 5,522,758 A | 6/1996 | Liu et al. | |
| 5,797,695 A * | 8/1998 | Prusmack | 403/170 |
| 6,389,718 B1 | 5/2002 | Joo | |
| 7,267,852 B1 * | 9/2007 | Rosado et al. | 428/20 |
| 2006/0112623 A1 * | 6/2006 | Charrin | 47/41.01 |
| 2007/0084489 A1 * | 4/2007 | Li | 135/28 |
| 2008/0311316 A1 | 12/2008 | Marlow | |

OTHER PUBLICATIONS

International Search Report for PCT Application PCT/DE2009/000397, dated Dec. 29, 2009.

* cited by examiner

*Primary Examiner* — Joshua J Michener
*Assistant Examiner* — Erin W Smith
(74) *Attorney, Agent, or Firm* — Bachman & LaPointe, P.C.

(57) ABSTRACT

The invention relates to a floral arrangement device (100) comprising at least one ring of circularly arranged leaves (120) with a free-standing upper region (121) and a lower region (122), by means of which they are joined to form a stable unit via a support device. According to the invention, detachably fixed variations of a basic layout are enabled in that each leave (120) is connected in the region of its lower end (122) to a pivoting arm (110) which is pivotably mounted to a hinge (131, 151), wherein the angle of said pivoting arm can be adjusted with respect to the horizontal by means of an adjustment device.

1 Claim, 5 Drawing Sheets

FLORAL ARRANGEMENT DEVICE WITH PIVOTABLE LEAVES

BACKGROUND

The invention relates to a floral arrangement device with at least one ring of circularly arranged leaves with a free-standing upper region and a lower region by means of which the leaves are joined together via a support device to form a stable unit.

Floral arrangement devices of the type referred to at the beginning are used in the prior art as decorative objects. However, the known devices have the disadvantage that a decorative object, once purchased, cannot undergo individualization permitting a detachably fixed variation of a basic configuration to be realized.

SUMMARY OF THE INVENTION

It is therefore the object of the invention to provide a floral arrangement device in which detachably fixed variations of a basic configuration are possible.

For a device of the type referred to at the beginning, this object is achieved in that each leaf is connected in the region of the lower end thereof to a pivoting arm which is mounted pivotably on a hinge and the angle of which can be adjusted in relation to the horizontal by means of an adjustment device.

Preferred embodiments of the invention are the subject matter of the dependent claims.

In the floral arrangement device according to the invention, the effect achieved by the feature that each leaf is connected in the region of the lower end thereof to a pivoting arm which is mounted pivotably on a hinge and the angle of which can be adjusted in relation to the horizontal by means of an adjustment device, is that an angle of leaves arranged circularly in a ring can be adjusted in relation to the horizontal in a detachably fixed manner in order thereby to enable the external appearance of the floral arrangement device as a decorative object to be changed and therefore to be made individual.

According to a first preferred embodiment of the device according to the invention, a pivoting arm has an upper part which is connected to a leaf, and a lower part which interacts with the adjustment device. In this case, the angle is preferably adjustable in relation to the horizontal of the upper part by means of an adjustment device.

According to an important preferred embodiment of the device according to the invention, each pivoting arm of a ring of circularly arranged leaves is in each case assigned an adjustment device. In this case, an adjustment device is preferably formed by an adjustment screw which is mounted rotatably on the support device and with the thread of which the lower part of each pivoting arm interacts.

For this purpose, the lower part of a pivoting arm may be designed, for example, in the shape of a wedge having a flat tip which engages in the thread of the adjustment screw. As an alternative, the lower part of a pivoting arm may also be connected to a nut which is placed on the thread of the adjustment screw.

According to another important preferred embodiment of the device according to the invention, an adjustment device is provided, said adjustment device interacting with all of the pivoting arms of a ring of circularly arranged leaves. In this case, an adjustment device is preferably formed by an adjustment ring which is mounted rotatably on the support device and has an external thread, the lower part of each pivoting arm interacting with the external thread of the adjustment ring.

For this purpose, the lower part of a pivoting arm is likewise designed in the shape of a wedge having a flat point which engages in the external thread of the adjustment ring. As an alternative, the lower part of a pivoting arm can have a thread in the region of the end thereof, said thread being matched to the external thread of the adjustment ring and engaging in the external thread of the adjustment ring.

According to a further important preferred embodiment of the device according to the invention, a support device is formed by two rings which are arranged one above the other epicentrally parallel and are partially fixedly connected to each other. In this case, the partially fixed connection of the rings arranged one above the other epicentrally parallel may be formed, for example, by bolts guided in corresponding bores in the rings.

According to the above embodiment, an adjustment ring can preferably be mounted in a bearing, one half of which is formed in an upper of the rings arranged one above the other epicentrally parallel, and the other half of which is formed in a lower of the rings arranged one above the other epicentrally parallel. In this case, the pivot pin of a pivoting arm is preferably mounted in a cutout, one half of which is formed in an upper of the rings arranged one above the other epicentrally parallel, and the other half of which is formed in a lower of the rings arranged one above the other epicentrally parallel.

Preferably, according to the above embodiment, the lower part of a pivoting arm is designed so as to be curved in a semicircular manner in the region of the end having the thread, with a pivot pin of the pivoting arm running through the center point of that circle, one half of which is formed by the semicircular end of the pivoting arm.

According to further preferred embodiments of the device according to the invention, a pivoting arm may be formed by a leaf stalk. A pivoting arm may furthermore also be designed as an integral part of a leaf.

A plurality of rings of circularly arranged leaves is preferably provided, wherein some of the rings of circularly arranged leaves can be designed to be adjustable and some of the rings of circularly arranged leaves can be designed to be fixed.

A support device is preferably formed by two rings which are arranged one above the other concentrically and which are partially fixedly connected to each other. In this case, an adjustment ring may be mounted in a bearing which is formed in each case by a cutout in the support device rings arranged one above the other concentrically.

BRIEF DESCRIPTION OF THE DRAWINGS

The device according to the invention is explained below with reference to a preferred embodiment which is illustrated in the figures of the drawing, in which.

DETAILED DESCRIPTION

Figure 1:
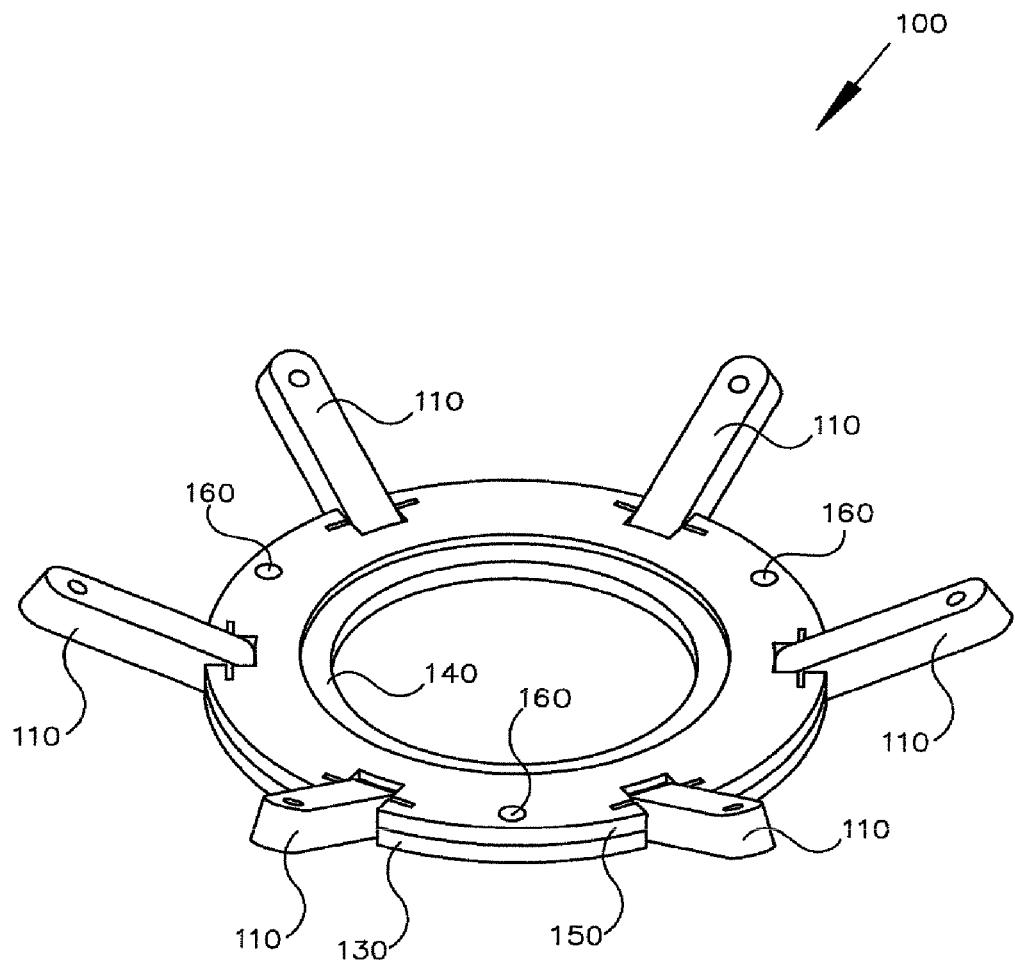
FIG. 1 shows a preferred embodiment of the device according to the invention, in a view obliquely from above.
Figure 2:
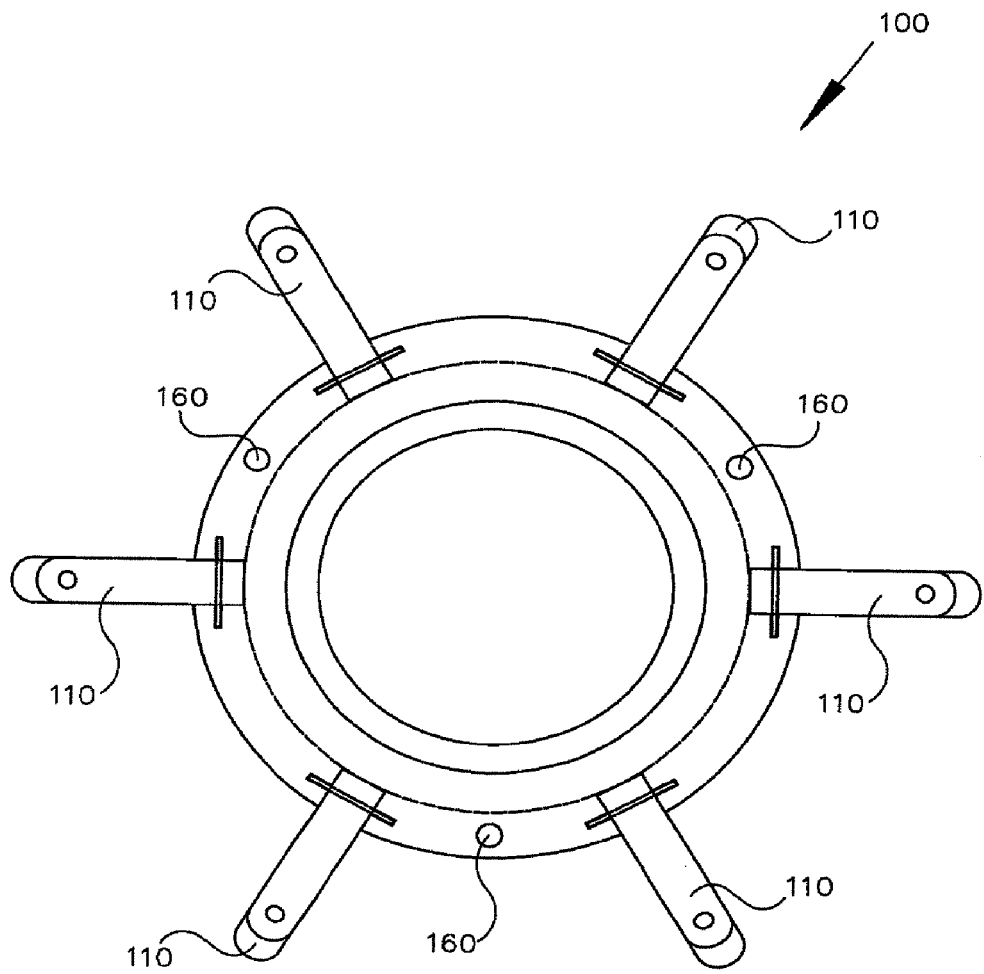
FIG. 2 shows the device according to the invention and illustrated in FIG. 1, in a view from above.
Figure 3:
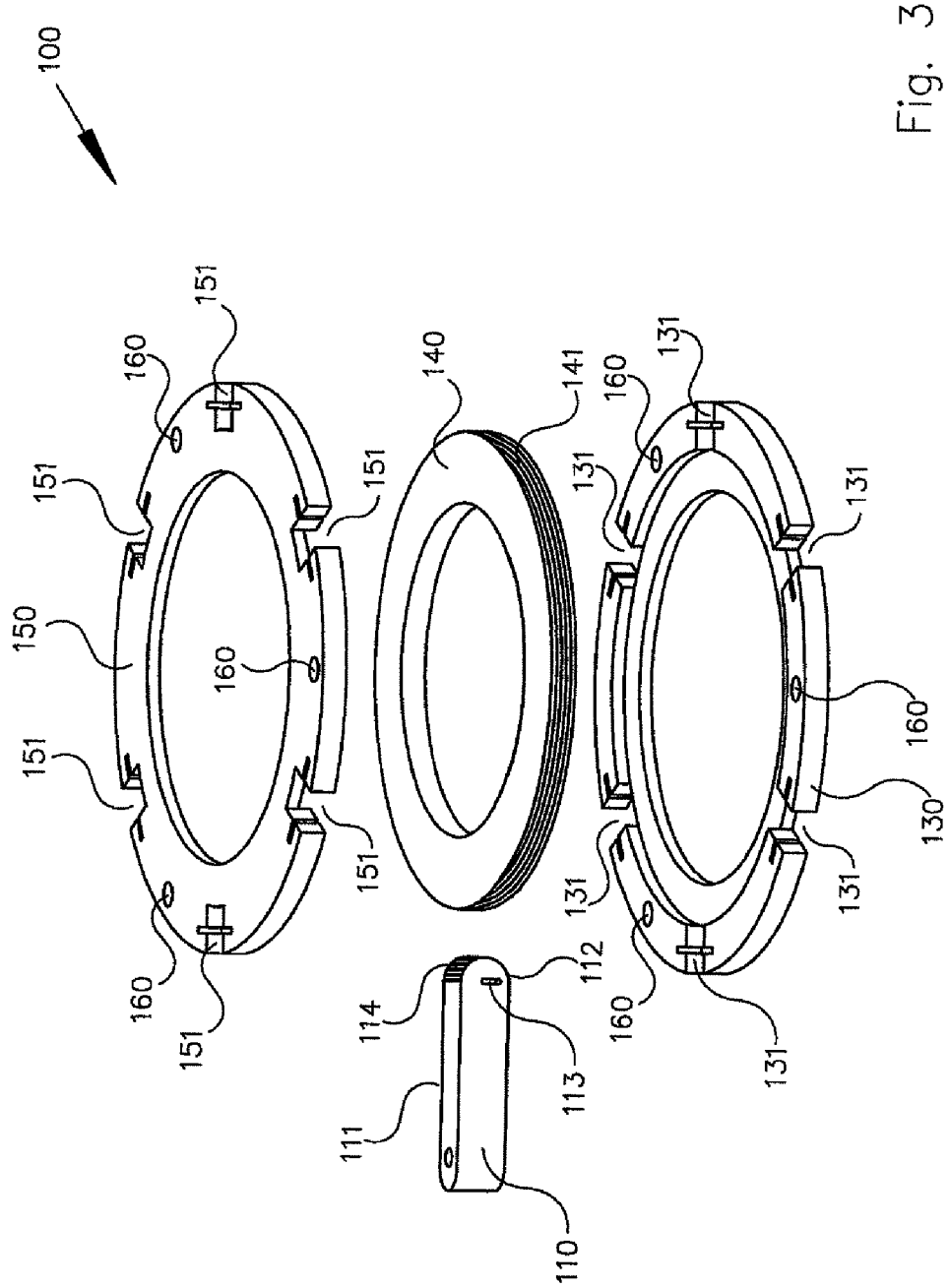
FIG. 3 shows the device according to the invention and illustrated in FIG. 1, in an exploded view.
Figure 4:
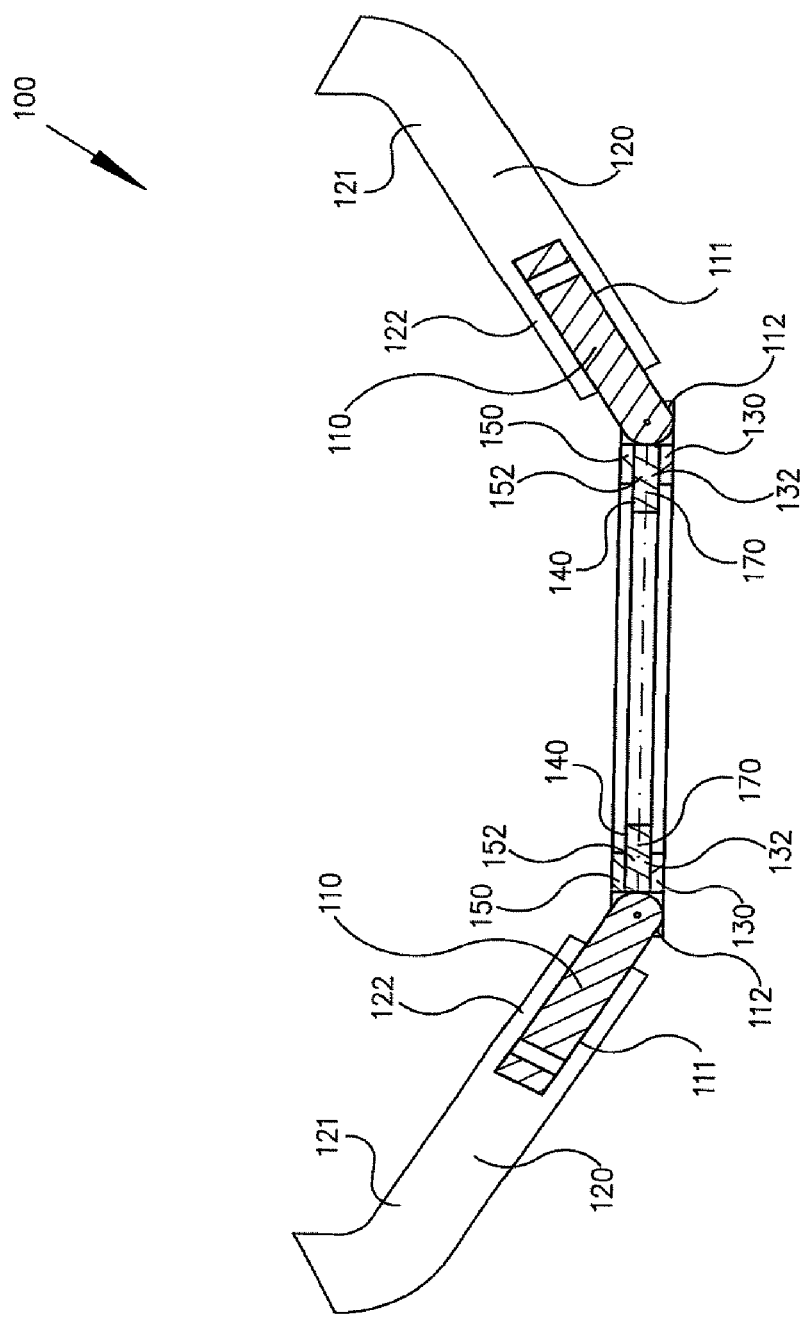
FIG. 4 shows the device according to the invention and illustrated in FIG. 1, in a cross sectional view.

The floral arrangement devices 100 according to the invention and illustrated in FIGS. 1 to 5 each contain a ring of circularly arranged leaves 120 with in each case a free-standing upper region 121 and in each case a lower region 122, wherein the leaves 120 are joined together via the lower region 122 in each case by a support device to form a stable unit. In this case, each leaf 120 is connected in the region of the lower end 121 thereof to a pivoting arm 110 which is mounted pivotably on a hinge 131, 151 and the angle of which can be adjusted in relation to the horizontal by means of an adjustment device.

A pivoting arm 110 in each case has an upper part 111 which is connected to a leaf 120, and a lower part 112 which interacts with the adjustment device. The angle can be adjusted here in relation to the horizontal of the upper part 111 by means of an adjustment device.

In the embodiment, which is illustrated in FIGS. 1 to 4, of the device 100 according to the invention, an adjustment device is provided, said adjustment device interacting with all of the pivoting arms 110 of a ring of circularly arranged leaves 120. In this case, the adjustment device is formed by an adjustment ring 140 which is mounted rotatably on the support device and has an external thread 141, the lower part 112 of each pivoting arm 110 interacting with the external thread 141 of the adjustment ring. According to this embodiment, the lower part 112 of a pivoting arm 110 is designed having a thread 114 in the region of the end 112 thereof, said thread being matched to the external thread 141 of the adjustment ring 140 and engaging in the external thread 141 of the adjustment ring 140. The lower part 112 of a pivoting arm 110 is designed so as to be curved in a semicircular manner in the region of the end having the thread 114, with a pivot pin of the pivoting arm 110 running through the center point of that circle, one half of which is formed by the semicircular end of the pivoting arm 110.

A support device is formed by two rings 130, 150 which are arranged one above the other epicentrally parallel and are partially fixedly connected to each other. The partially fixed connection of the rings 130, 150 arranged one above the other epicentrally parallel is formed here by bolts guided in corresponding bores 160 in the rings.

An adjustment ring 140 is mounted in a bearing 170, one half 152 of which is formed in an upper of the rings 130, 150 arranged one above the other epicentrally parallel, and the other half 132 of which is formed in a lower of the rings 130, 150 arranged one above the other epicentrally parallel. Likewise, the pivot pin of a pivoting arm 110 is mounted in a cutout 131, 151, one half of which is formed in an upper of the rings 130, 150 arranged one above the other epicentrally parallel, and the other half 131 of which is formed in a lower of the rings 130, 150 arranged one above the other epicentrally parallel.

In the embodiments, which are illustrated in FIGS. 1 to 4, of the device according to the invention, the upper part 111 of a pivoting arm 110 can be fixedly fitted into a corresponding cutout in a leaf 120. According to alternative embodiments, a pivoting arm 110 may also be designed as an integral part of a leaf 120.

A support device is formed by two rings 130, 150 which are arranged one above the other concentrically and are partially fixedly connected to each other. An adjustment ring 140 is mounted in a bearing 170 which is formed in each case by a cutout 132, 152 in the rings 130, 150, which are arranged one above the other concentrically, of the support device.

In the embodiment, which is illustrated in FIGS. 1 to 4, of the device 100 according to the invention, only one ring of circularly arranged leaves 120 is illustrated, for the sake of clarity. In an embodiment having a plurality of rings of circularly arranged leaves 120, the corresponding pivoting arms 110 act mutatis mutandis.

Figure 5:
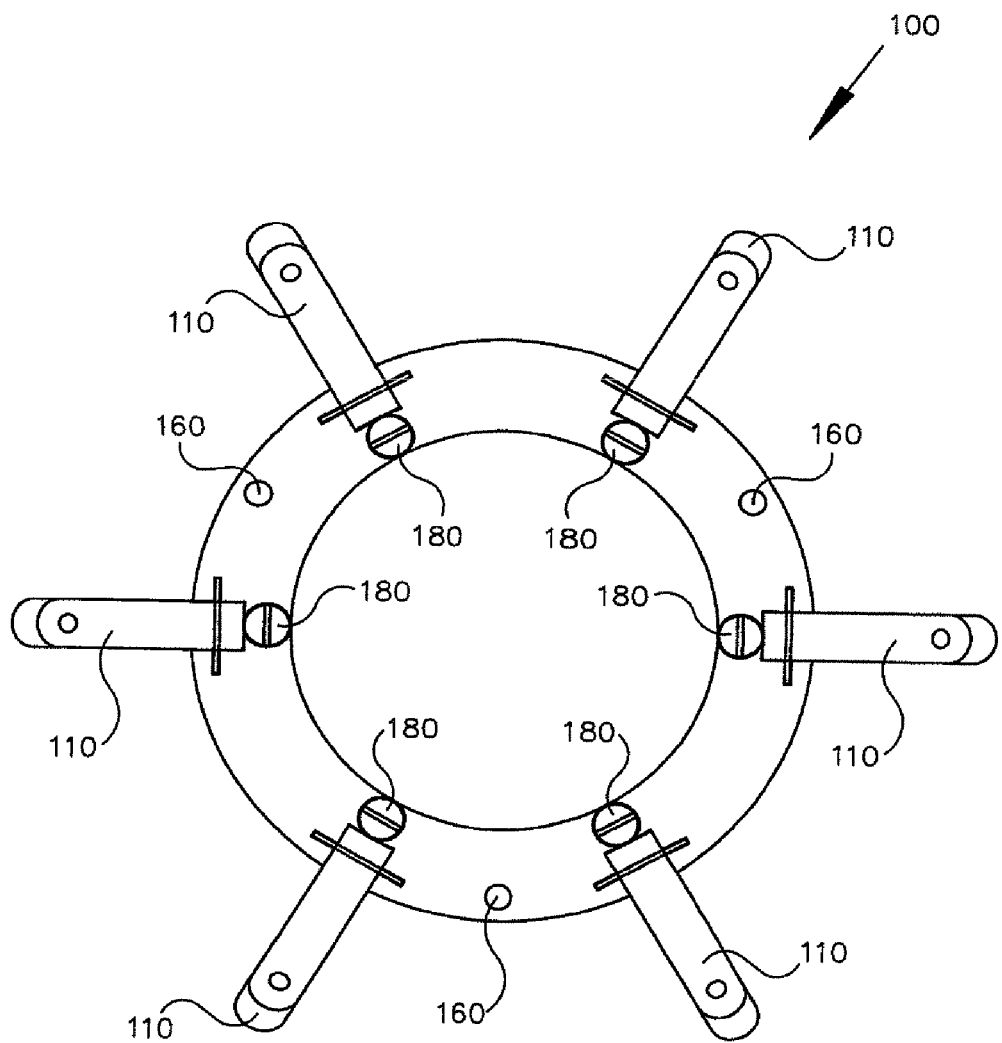
FIG. 5 shows a second embodiment of the device according to the invention and illustrated in FIG. 1, in a view from above.

In the embodiment, which is illustrated in FIG. 5, of the device 100 according to the invention, each pivoting arm 110 of a ring of circularly arranged leaves 120 is in each case assigned an adjustment device. In this case, an adjustment device is formed by an adjustment screw 180 which is mounted rotatably on the support device, with the thread of which the lower part 112 of each pivoting arm 110 interacts, wherein the lower part 112 of a pivoting arm 110 is designed in the shape of a wedge having a flat tip which engages in the thread of the adjustment screw 180.

The above-explained exemplary embodiments of the invention serve merely for the purpose of better understanding of the teaching according to the invention which is defined by the claims and is not limited as such by the exemplary embodiments.

What is claimed is:

1. A floral arrangement device (100) with at least one ring of circularly arranged leaves (120) with a free-standing upper region (121) and a lower region (122) by means of which the leaves (120) are joined together via a support device (131, 151) to form a stable unit, characterized in that:

each leaf (120) is connected in the region of the lower end (122) thereof to a pivoting arm (110) which is mounted pivotably on a hinge (131, 151) and an angle of the pivoting arm can be adjusted by means of an adjustment device (140, 180);

said adjustment device is formed by an adjustment ring (140) which is mounted rotatably on the support device and has an external thread (141), the lower part (112) of each pivoting arm (110) interacting with the external thread (141) of the adjustment ring; and the lower part (112) of a said pivoting arm (110) is designed so as to be curved in a semicircular manner in the region of the end having the thread (114), with a pivot pin of the pivoting arm (110) running through the center point of that circle, one half of which is formed by the semicircular end of the pivoting arm (110).

* * * * *